United States Patent
Wu

(10) Patent No.: US 8,160,413 B2
(45) Date of Patent: Apr. 17, 2012

(54) FIBER OPTIC COUPLER WITH VARIABLE COUPLING RATIO AND MANUFACTURING METHOD THEREOF

(75) Inventor: Cheng-Wen Wu, Taichung (TW)

(73) Assignee: Feng Chia University, Taichung (TW)

( * ) Notice: Subject to any disclaimer, the term of this patent is extended or adjusted under 35 U.S.C. 154(b) by 404 days.

(21) Appl. No.: 12/419,862

(22) Filed: Apr. 7, 2009

(65) Prior Publication Data

US 2010/0080509 A1   Apr. 1, 2010

(30) Foreign Application Priority Data

Sep. 26, 2008  (TW) ................................ 97137318 A

(51) Int. Cl.
*G02B 6/26* (2006.01)
(52) U.S. Cl. ............................................ 385/43; 385/50
(58) Field of Classification Search ...................... 385/43
See application file for complete search history.

(56) References Cited

U.S. PATENT DOCUMENTS

| 4,763,977 A | * | 8/1988 | Kawasaki et al. ................ 385/43 |
| 6,731,842 B2 | * | 5/2004 | Chen ................................ 385/43 |

* cited by examiner

*Primary Examiner* — Omar Rojas
(74) *Attorney, Agent, or Firm* — Ming Chow; Sinorica, LLC

(57) ABSTRACT

A fiber loop formed by bending of a connection section between the first fiber and the second fiber includes a coupling region and an upper taper region as well as a down taper region arranged symmetrically on two sides of the coupling region. Then the fiber optic splitter with the fiber loop is assembled with a splitting ratio modulation mechanism. Thus the manufacturing of the fiber optic power splitter with variable splitting ratio is simplified and this favors production and applications of the device. Moreover, the splitting and modulation quality of the splitter are stable and are controlled precisely. Thus the economic benefits of the device in manufacturing, operation quality and product competitiveness are all improved.

12 Claims, 8 Drawing Sheets

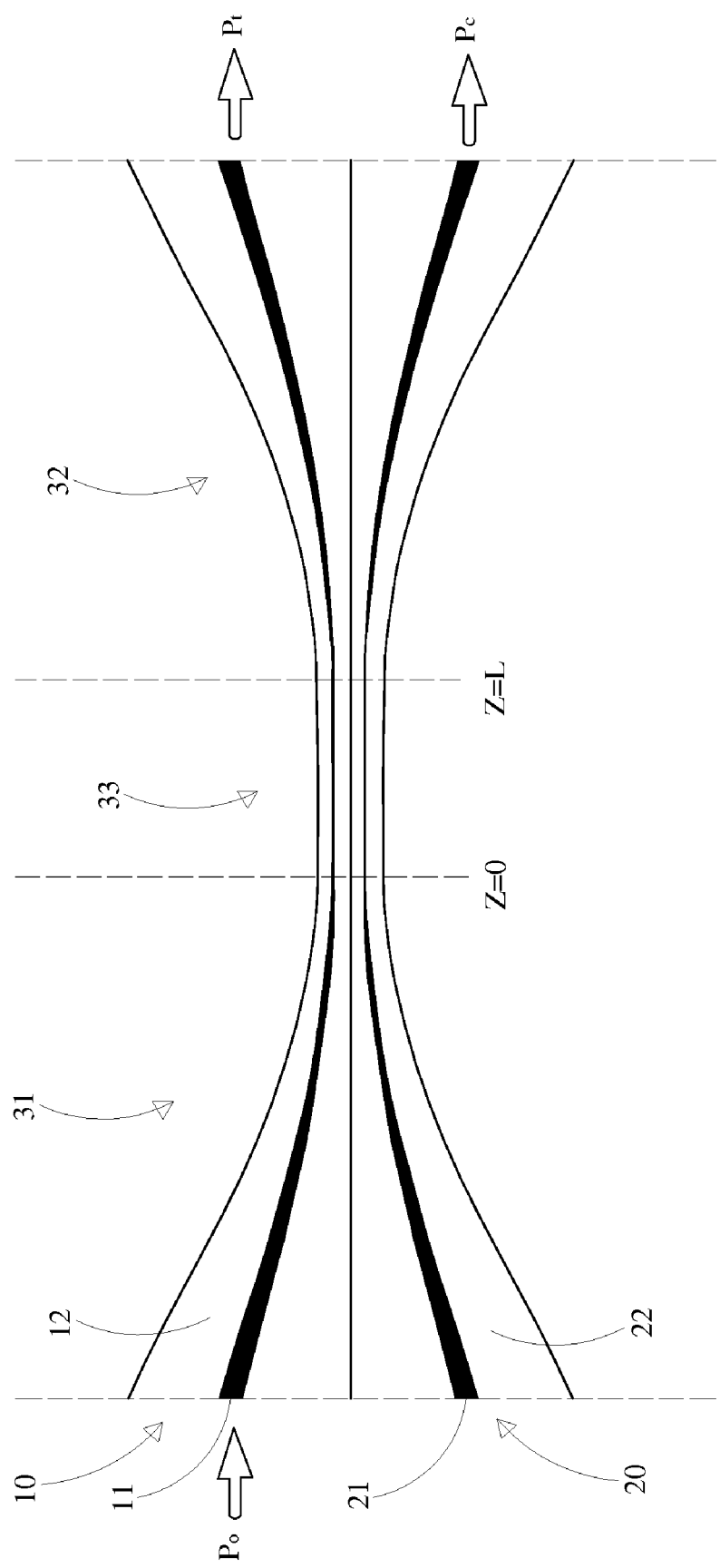

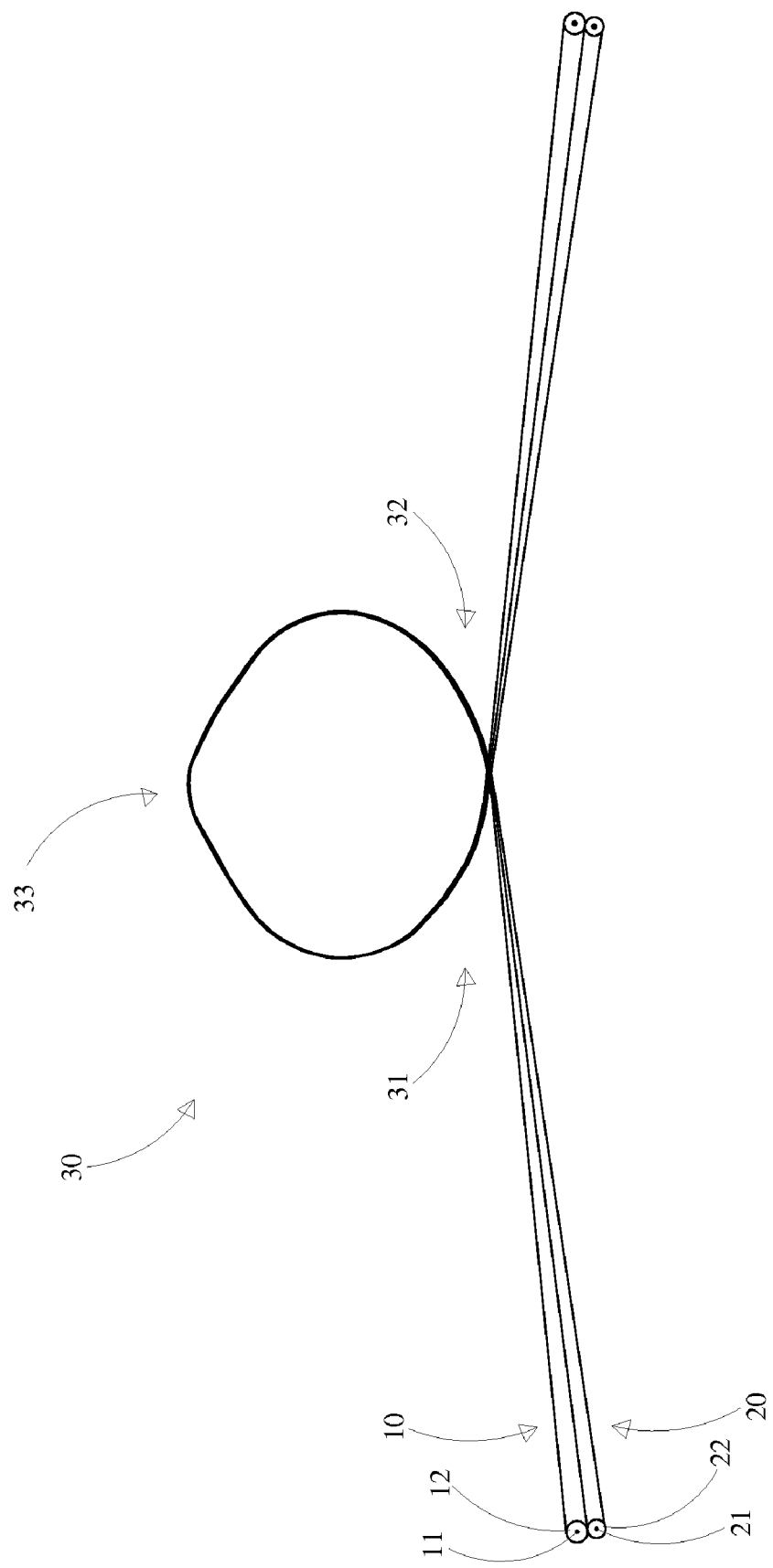

FIBER OPTIC COUPLER WITH VARIABLE COUPLING RATIO AND MANUFACTURING METHOD THEREOF

BACKGROUND OF THE INVENTION

1. Field of Invention

The present invention relates to an optical beam splitter, especially to a fiber optic coupler with variable coupling ratio and a manufacturing method thereof.

2. Description of Related Art

A fiber optic coupler transfers optical signals from one medium such as an optical fiber to other ends so that signals from an input fiber can appear at more outputs. That means it can distribute the optical signal (power) from one fiber among two or more fibers. Thus the fiber optic coupler is applied to signal/data transmission systems such as digital subscriber line system, local area networks, and cable TV networks. However, the output ratio of conventional couplers is fixed so that its development and application are limited. Thus a fiber optic coupler with variable coupling ratio is further developed, as shown in U.S. Pat. Nos. 4,493,528 and 4,763,977.

Refer to U.S. Pat. No. 4,493,528, two fiber optic strands 11 are mounted in slots 18 formed by two bases or blocks 16 to provide proper coupling. Transducers or drivers are connected to the upper block and the lower block 16 for translating the blocks back and forth. By varying the relative positions and/or orientations of the blocks 16 and the fiber optic strands 11, the coupling ratio of the fiber optic strands 11 is variable and adjusted. Although the coupling ratio of the fiber optic coupler is variable, the manufacturing of the coupler requires high precision so that the manufacturing cost and the product price are quite high. This has negative effects on applications of the device. Moreover, the fiber optic strands 11 in the blocks 16 are easy to be affected by environmental factors such as temperature change. Thus the operation of the coupling ratio is difficult to be controlled precisely and consistently. Moreover, the input light of the coupler is with suitable wavelength so that it has relatively narrow applications. Once the operating wavelength is changed, the coupler should be changed and this is not economic and efficient.

Refer to U.S. Pat. No. 4,763,977, a coupler 14 is fabricated with fibers (1A, 1B) being mounted on a flat spring base 4 and having a bent portion in a U or S-shape. A micrometer 7 or equivalent apparatus is used to bend the spring base 4, thus straightening or otherwise stressing the bent portion in the coupler 14. The degree of energy coupled between fibers 1A and 1B is dynamically varied by the micrometer 7 so that a light spot 5 and a light spot 8 on the fibers 1A, 1B are dimming or illuminating. Yet the coupler is mounted on the spring base 4 that is driven and adjusted by the micrometer 7. The device is also under influence of environmental factors and is difficult to implement. Furthermore, only by the bent portion in a U or S-shape, the couplers have quite narrow tuning range of the coupling ratio so that they have limited applications. Thus there is no product with such design available on the market now.

The conventional fiber optic couplers with variable coupling ratio have shortcomings of unstable tuning quality of the coupling ratio, imprecise control and narrow tuning range of the coupling ratio and difficulties in implementation so that there is a need to provide new fiber optic couplers with variable coupling ratio that overcome these problems.

SUMMARY OF THE INVENTION

Therefore it is a primary object of the present invention to provide a fiber optic coupler with variable coupling ratio and a manufacturing method thereof that make the manufacturing of the fiber optic coupler with variable coupling ratio easy and simple for convenience of production and applications. Moreover, the modulation quality of the coupling ratio of the coupler becomes stable and able to be controlled precisely. Thus the economic benefits of the coupler in manufacturing, operation quality and product competitiveness are all dramatically improved.

It is another object of the present invention to provide a fiber optic coupler with variable coupling ratio and a manufacturing method thereof that make the coupler have broader tuning range of the coupling ratio, wider working wavelength range and excellent performance. Moreover, the coupler is easy to be manufactured on general machines that produce fiber optic couplers. The coupler requires no precision tuning mechanisms for the coupling ratio, so that the cost is reduced. This favors mass production and the coupler is packaged by simple mechanism for applications. The bottleneck of the technique available now is broken through.

It is a further object of the present invention to provide a fiber optic coupler with variable coupling ratio and a manufacturing method thereof that improve performance of the optical fiber module and system having the fiber optic coupler and explore new uses so as to be applied to optical communication industry, optoelectronic measurement industry, and fiber optic sensor industry broadly.

In order to achieve above objects, a fiber optic coupler with variable coupling ratio of the present invention consists of an optical fiber set and a fiber loop. The optical fiber set includes at least one first optical fiber and at least one second optical fiber respectively with a connection portion. The first optical fiber as well as the second optical fiber is single-core single-mode fiber formed by a core on an inner layer and a cladding on an outer layer. The fiber loop is formed by bending of the connection portion of the first optical fiber as well as the connection portion of the second optical fiber. The connection portion (fiber loop) consists of a coupling region, a down taper region and an upper taper region on two sides of the coupling region.

A manufacturing method of fiber optic couplers with variable coupling ratio according to the present invention includes the following steps: (1) produce a fiber optic coupler by fusion of claddings of at least two single-core single-mode fibers. Under heated and fused state, the fused claddings are extended from the two ends to form a fiber optic coupler with a linear coupling region and two taper regions on two ends of the coupling region; (2) bend a fiber loop: bend the fiber optic coupler with the linear coupling region and the taper regions to form the fiber loop; (3) assemble a coupling ratio modulation member: fix two ends of the fiber optic coupler with the fiber loop on two bases.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1A is a schematic drawing showing structure of a weakly-fused fiber optic coupler according to the present invention;

FIG. 2 is a schematic drawing showing a fiber loop according to the present invention;

DETAILED DESCRIPTION OF THE PREFERRED EMBODIMENT

Figure 1B:
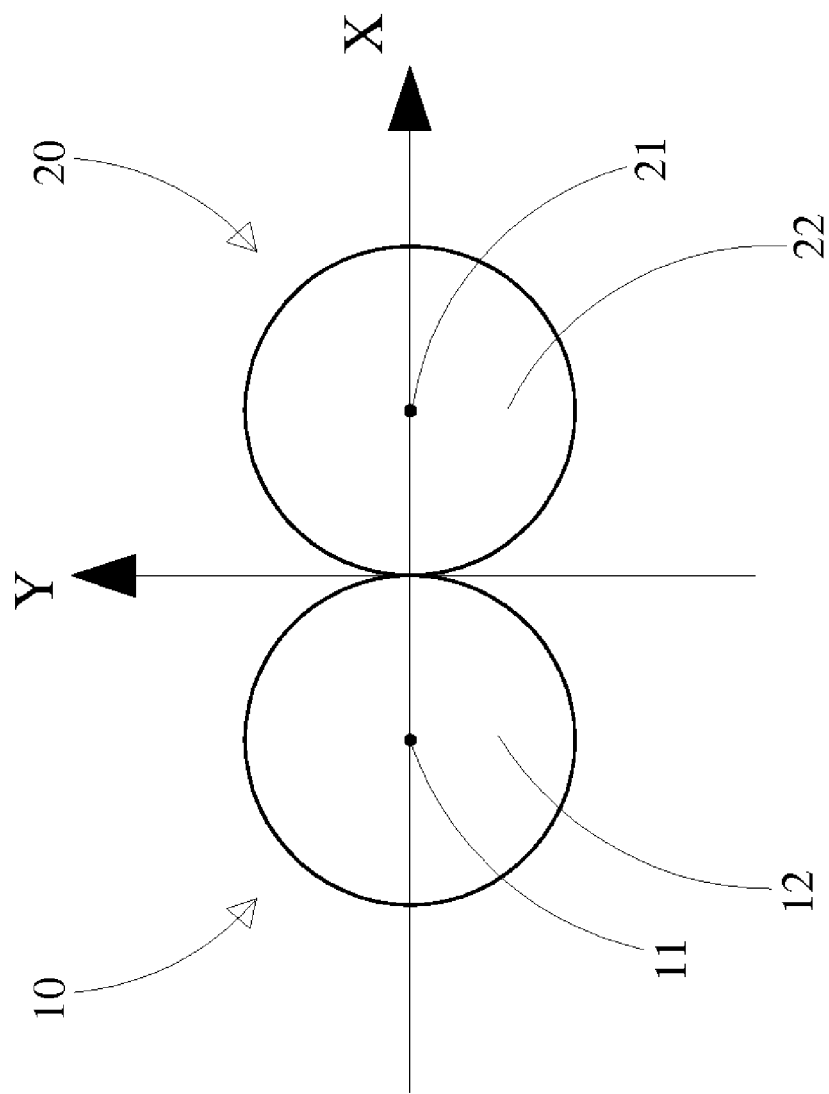
FIG. 1B is a schematic drawing showing cross sectional view of a coupling region according to the present invention.

Refer from FIG. 1A to FIG. 2, a fiber optic coupler with variable coupling ratio according to the present invention consists of a first optical fiber 10, a second optical fiber 20 and a fiber loop 30. The first optical fiber 10 and the second optical fiber 20 that form an optical fiber set are single-core single-mode fibers, respectively having a core 11, 21 on an inner layer and a cladding 12, 22 on an outer layer. The claddings 12, 22 are enclosed by a protective sheath (not shown in figure) and have part of longitudinal connection portion (fusion portion). The connection portion is divided into three regions—a down taper region 31, a coupling region 33 and an upper taper region 32. The fiber loop 30 is formed by bending of the connection portion of the first optical fiber 10 as well as the connection portion of the second optical fiber 20. Thus the fiber loop 30 formed by the connection portion includes the coupling region 33, the down taper region 31 and upper taper region 32 on two sides of the coupling region 33. As shown in FIG. 1A, along an optical axis, diameter of the cores 11, 21 and the claddings 12, 22 is gradually getting narrowing towards the end of the down taper region 31. In the coupling region 33, the diameter maintains the same. Later along the upper taper region 32, the diameter gradually increases into original size. By bending of the down taper region 31, the coupling region 33, and the upper taper region 32, the fiber loop 30 is formed. Moreover, one end of the first optical fiber 10 is connected with a light source such as a He—Ne laser, so that the first optical fiber has an input optical power $P_o$ for performing light coupling, splitting and transmission.

While manufacturing, the connection portion (fusion portion) of the claddings 12, 22 is extended and diameter of the cores 11, 21 is getting quite smaller before entering the coupling region 33. Thus when the input optical power $P_o$ is transmitted to here, it leaks out of the core 11 and two lowest order modes of the coupling region 33 are excited. As shown in FIG. 1B, part of the cross section of the coupling region 33 is weakly fused claddings 12, 22 and part is air outside the claddings 12, 22. These two lowest order modes are respectively an even mode and an odd mode with different propagation constants and effective refractive indexes that change along with diameter of the coupling region 33. When the two modes are transmitted to the rear end of the coupling region 33, a phase difference and an intensity distribution of interference are generated. The intensity distribution of interference re-enters the cores 11, 21 of output fibers of the first and the second optical fibers 10, 20 along with increasing diameter of the cores 11, 21 of the upper taper region 32. Optical power of output fibers of the first optical fiber 10 as well as the second optical fiber 20 respectively is:

$$P_t = P_0 \cos^2 \frac{\Delta \phi}{2}$$

$$P_c = P_0 \sin^2 \frac{\Delta \phi}{2}$$

Wherein $P_t$ is output power of a throughput output fiber, $P_c$ is output power of a coupled output fiber, and $\Delta\Phi$ is a phase difference between the even mode and the odd mode while propagating to the rear end of the coupling region 33. The phase difference can also be represented by the effective refractive index difference $\Delta n$ between the two modes:

$$\Delta \phi = \Delta \beta L = \frac{2\pi}{\lambda} \Delta n L$$

wherein $\Delta\beta$ is the propagation constant difference between the even mode and the odd mode, L is length of the coupling region 33, and λ is wavelength of light in the optical fiber. By the effective refractive index difference $\Delta n$, the output power of the throughput output fiber as well as the coupled output fiber is represented in the following equation:

$$P_t = P_0 \cos^2 \frac{\pi}{\lambda} \Delta n L$$

$$P_c = P_0 \sin^2 \frac{\pi}{\lambda} \Delta n L$$

As shown in these two equations, the output power of the fiber optic coupler or coupling ratio of the two output ports (ends) changes along with change of the extension length while the fiber optic coupler is heated and produced. The longer the extension length is, the smaller the diameter of the coupling region 33 is and the larger the effective refractive index difference $\Delta n$ is. The coupling ratio of the throughput output end $R_t$ and that of the coupled output end $R_c$ of the fiber optic coupler are defined as follows:

$$R_t = \left(\frac{P_t}{P_t + P_c}\right) \times 100\%$$

$$R_c = \left(\frac{P_c}{P_t + P_c}\right) \times 100\%$$

Besides along with change of the diameter of the coupling region 33, the effective refractive index difference $\Delta n$ also varies along with changes of curvature of the coupling region 33. Due to bending and stress, the refractive index of the coupling region 33, the effective refractive index of the even mode and that of the odd mode also change. But the changes of the effective refractive index of the two modes are different, the effective refractive index difference $\Delta n$ also varies. Once the diameter of the coupling region 33 is the same while the coupling region 33 is bent, not linear, the output power of the throughput output fiber as well as the coupled output fiber is represented in the following equation:

$$P_t = P_0 \cos^2 \frac{\pi}{\lambda} \Delta n(\rho) L$$

$$P_c = P_0 \sin^2 \frac{\pi}{\lambda} \Delta n(\rho) L$$

Wherein ρ is a curvature radius of the coupling region 33. Once the curvature of the coupling region 33 of the fiber optic coupler is adjusted, the output coupling ratio of the fiber optic coupler is changed. By means of this feature, the present invention includes the two taper regions (down taper region 31 and upper taper region 32) together with the coupling region 33 to form the fiber loop 30. By change of the circumference of the fiber loop 30, the curvature of the coupling region 33 is adjusted. Thus a fiber optic coupler with variable coupling ratio is obtained.

After being manufactured, the fiber optic coupler with variable coupling ratio of the present invention is packaged to be applied to fiber optic components. It can also be directly connected with common mono-core optical fibers for use or assembled with other components to form modules mounted in communication systems for providing users better communication quality. Moreover, the device is further applied to optical communication industry, optoelectronic measurement industry, and fiber optic sensor industry. For example, the device is applied to the interferometric fiber optic sensor for improving sensor performance. Once the fiber optic coupler is applied to fiber lasers, the output power can be changed. Furthermore, once the device is used in splitters in the passive optical network (PON), the optical power provided to the users is adjustable and the management of the optical network is more flexible. A single mode fiber optic coupler according to the present invention not only has advantages of lower transmission loss, high reliability and low cost, but also can be connected directly with optical fiber systems, so that it has wide applications in opto-electronic systems.

Figure 3:
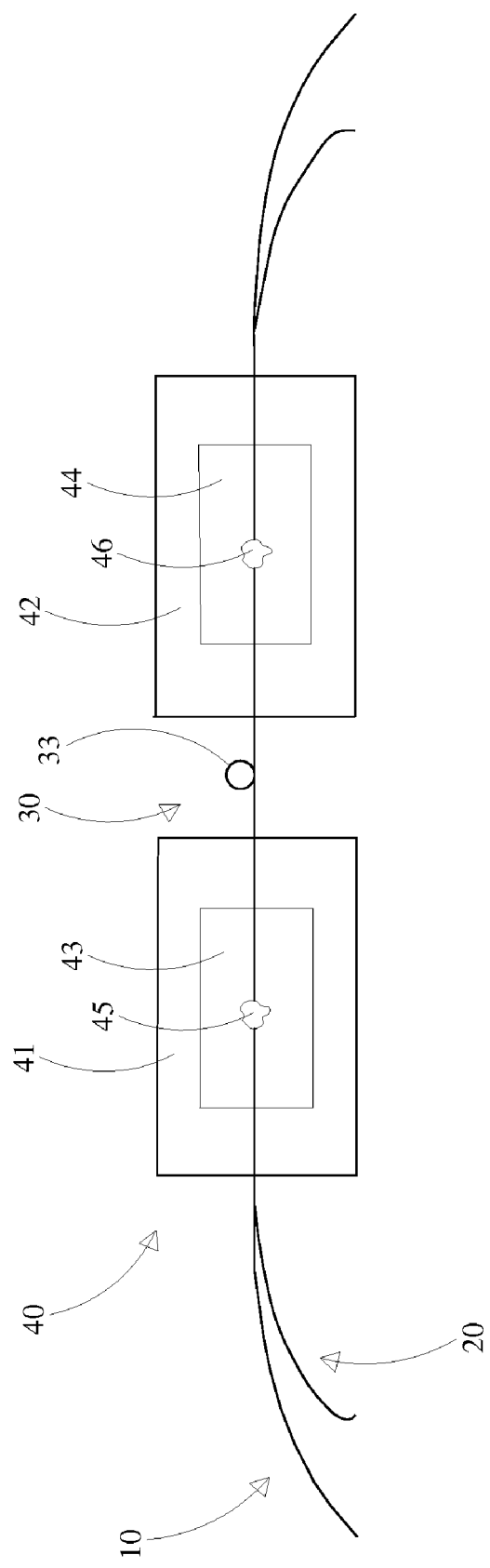
FIG. 3 is a schematic drawing of a modulation member for tuning coupling ratio according to the present invention.

Refer to FIG. 3, a fiber optic coupler with variable coupling ratio of the present invention further includes a modulation member 40 having a first base 41 and a second base 42. After formation of the above mentioned fiber loop 30, two ends of the first and the second optical fibers 10, 20 respectively are jointed with loading parts (socket) 43, 44. The two ends of the fiber optic coupler with the fiber loop 30 are attached on the two loading parts 43, 44 by UV glue (adhesive) 45, 46, so that the fiber loop 30 is in the middle part and is in a moveable and controllable state. Then the two loading parts 43, 44 together with the first and the second optical fibers 10, 20 (with the fiber loop 30) are disposed on the first base 41 and the second base 42, so that the two ends of the first and the second optical fibers 10, 20, toward the fiber loop 30, are at last fixed on the first base 41 and the second base 42. In an embodiment of the present invention, the first base 41 is a fixed base while the second base 42 is a removable base. Thus by movement of the second base 42, the circumference and positions of intersection points of the fiber loop 30 change. Thus curvature of the coupling region 33 and the propagation constant difference between the even mode and the odd mode further change. Therefore, the coupling ratio of the fiber optic coupler is modulated by the distance traveled of the second base 42 (moveable base). In another embodiment, both the first base 41 and the second base 42 can be moveable bases. By movement of the first base 41 and the second base 42, the coupling ratio of the fiber optic coupler can also be modulated.

Figure 4:
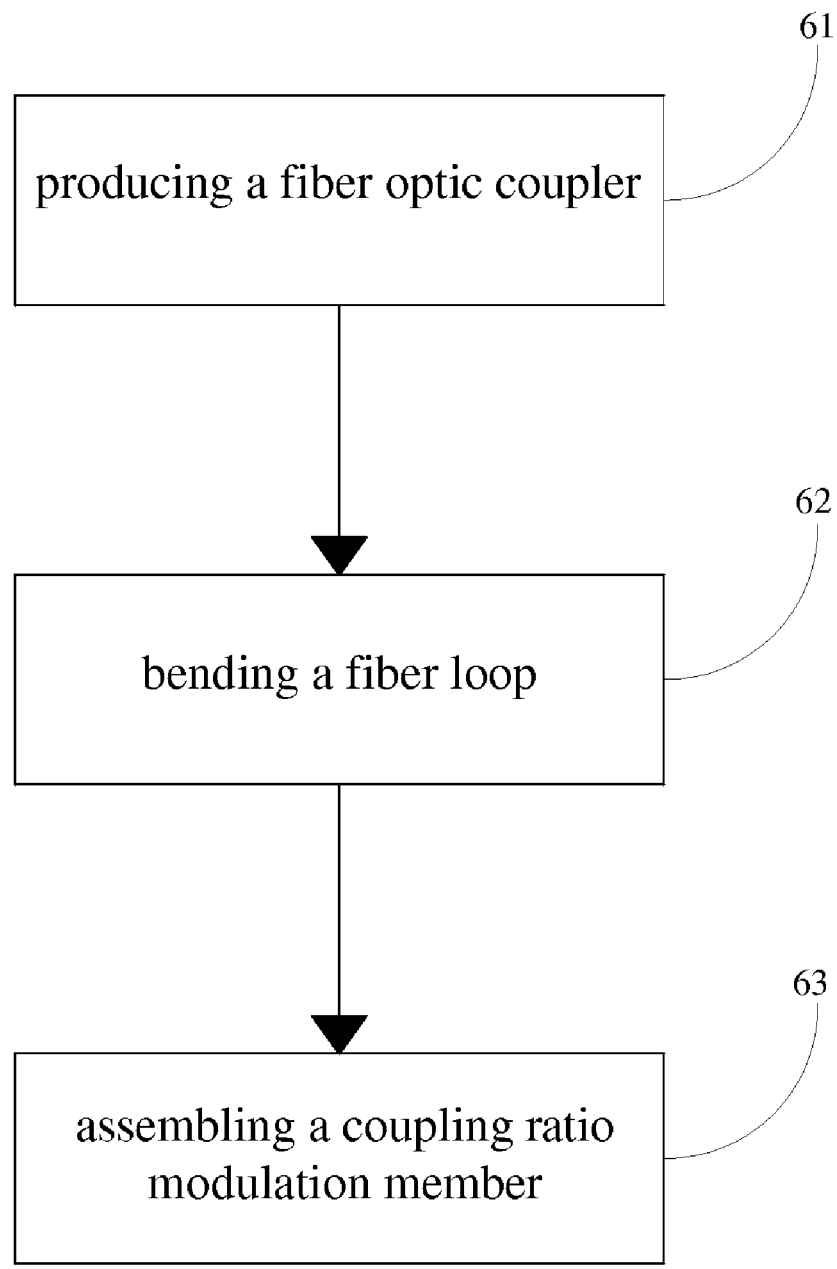
FIG. 4 is a manufacturing flow chart of an embodiment according to the present invention.
Figure 5:
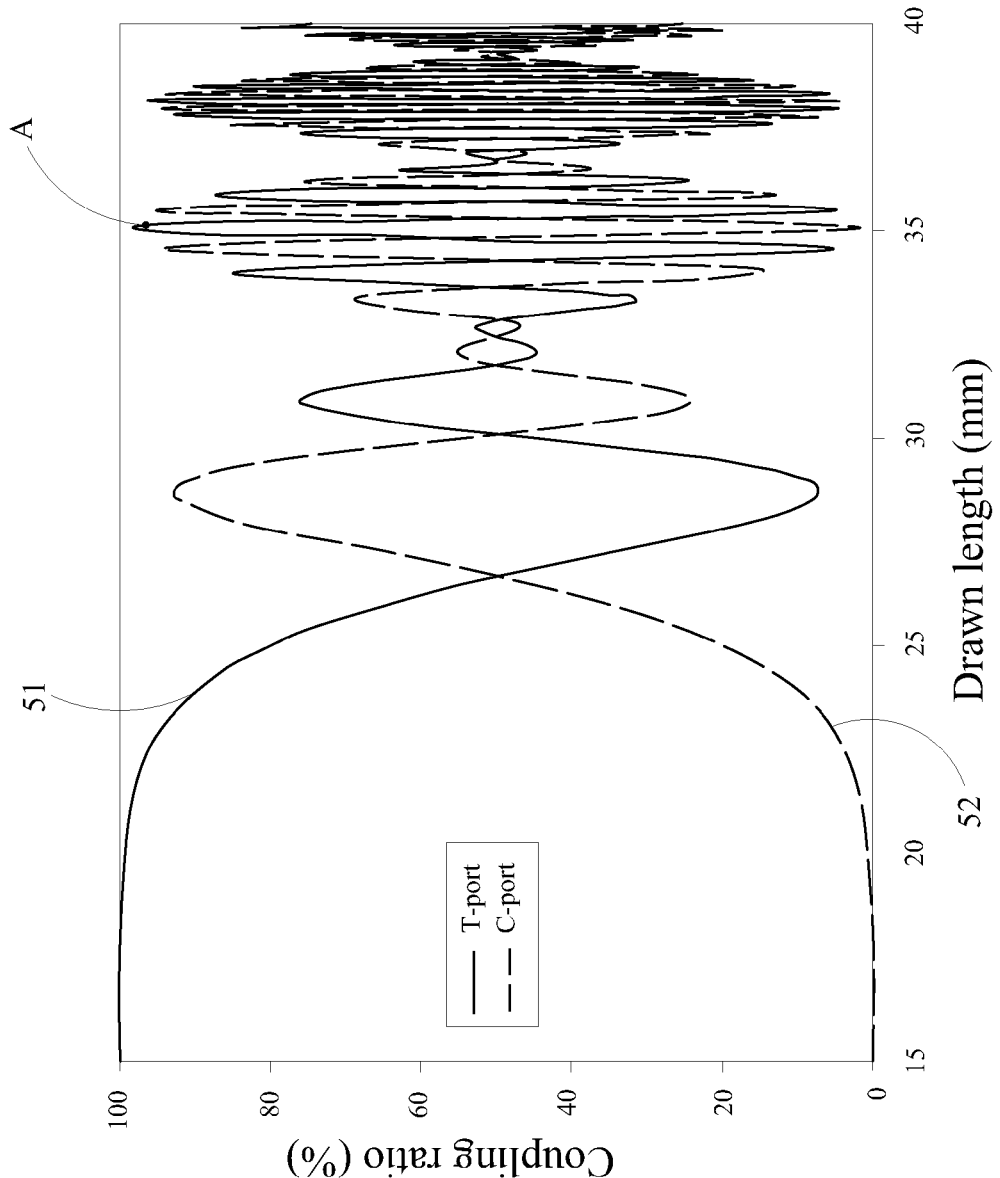
FIG. 5 shows change of coupling ratio of the weakly-fused fiber optic coupler during extension process.

Refer to FIG. 4, a manufacturing method of fiber optic couplers with variable coupling ratio according to the present invention consists of following steps:

(1) step 61: produce a fiber optic coupler;

Remove a protective layer with the same length of the same two single-core single-mode fibers (the first and the second) 10, 20 and cross and attach them with each other. The middle part of the exposed, cross and attached fibers is heated by a heat source, so that the claddings 12, 22 of this part are weakly fused. Keep heating the fused part of the claddings 12, 22 (connection/fusion portion) and stretch from the two ends to form a fiber optic coupler with a linear coupling region 33 and two taper regions (down taper region 31 and upper taper region 32). The coupling ratio of the coupler changes along with the extension length. As shown in FIG. 5, the total extension length of the fiber optic coupler is 40 mm. The solid line represents change of the coupling ratio of the throughput output fiber 51 and the dash line represents change of the coupling ratio of the coupled output fiber 52. Taking throughput output fiber as an example, the curve of change of the coupling ratio 51 is formed by superposition of the coupling ratio curve of the X-polarized component of the incident light and the coupling ratio curve of the Y-polarized component of the incident light. Since the power transfer phases $$\left( = \frac{\pi}{\lambda} \Delta n L \right)$$

of the two polarized components are different, polarization-modulated wave packet appears on the superposed curve of the change of the coupling ratio. In a polarization modulation waist region of the wave packet, the power transfer phase difference between the X-polarized component and the Y-polarized component of the incident light is near $\pi/2$. At the peak of the wave packet, the power transfer phase difference between the X-polarized component and the Y-polarized component of the incident light is near $\pi$. The figure also shows that weakly-fused fiber optic coupler has smaller change of effective refractive index difference and larger form birefringence. The smaller change of effective refractive index difference leads to larger period of the coupling ratio change and the larger form birefringence causes the modulation waist of the polarization-modulated wave packet appearing only after a few periods of change of the coupling ratio. One area point near the peak of the polarization-modulated wave packet is a break point of manufacturing of the fiber optic couplers according to the present invention. In this embodiment, the area point is point A in FIG. 5. The extension length corresponding to the point A is about 35 mm. Moreover, the step of producing the fiber optic coupler 61 can be run on general machines (not shown in figure) that manufacture single mode fiber optic couplers. It's simple and easy to be implemented. The machine includes two extension bases that position and stretch two ends of the optical fibers 10, 20. By the extension bases, the first and the second optical fibers 10, 20 are stretched to form a linear coupling region 33 and two taper regions (down taper region 31 and upper taper region 32).

(2) step 62: bend a fiber loop; After the fiber optic coupler being produced at the point A mentioned above, the two extension bases turn back and move toward original positions until the coupling region 33 of the fiber optic coupler, the down taper region 31 and the upper taper region 32 form a fiber loop 30. Because the two taper regions (down taper region 31 and upper taper region 32) are tapered while the coupling region 33 is long enough with relative smaller diameter, the down taper region 31 and the upper taper region 32 are adjusted to locate on two sides of the bent coupling region 33 while the intersection points are on area with larger diameter of the down taper region 31 and the upper taper region 32, as shown in FIG. 2.

Figure 6:
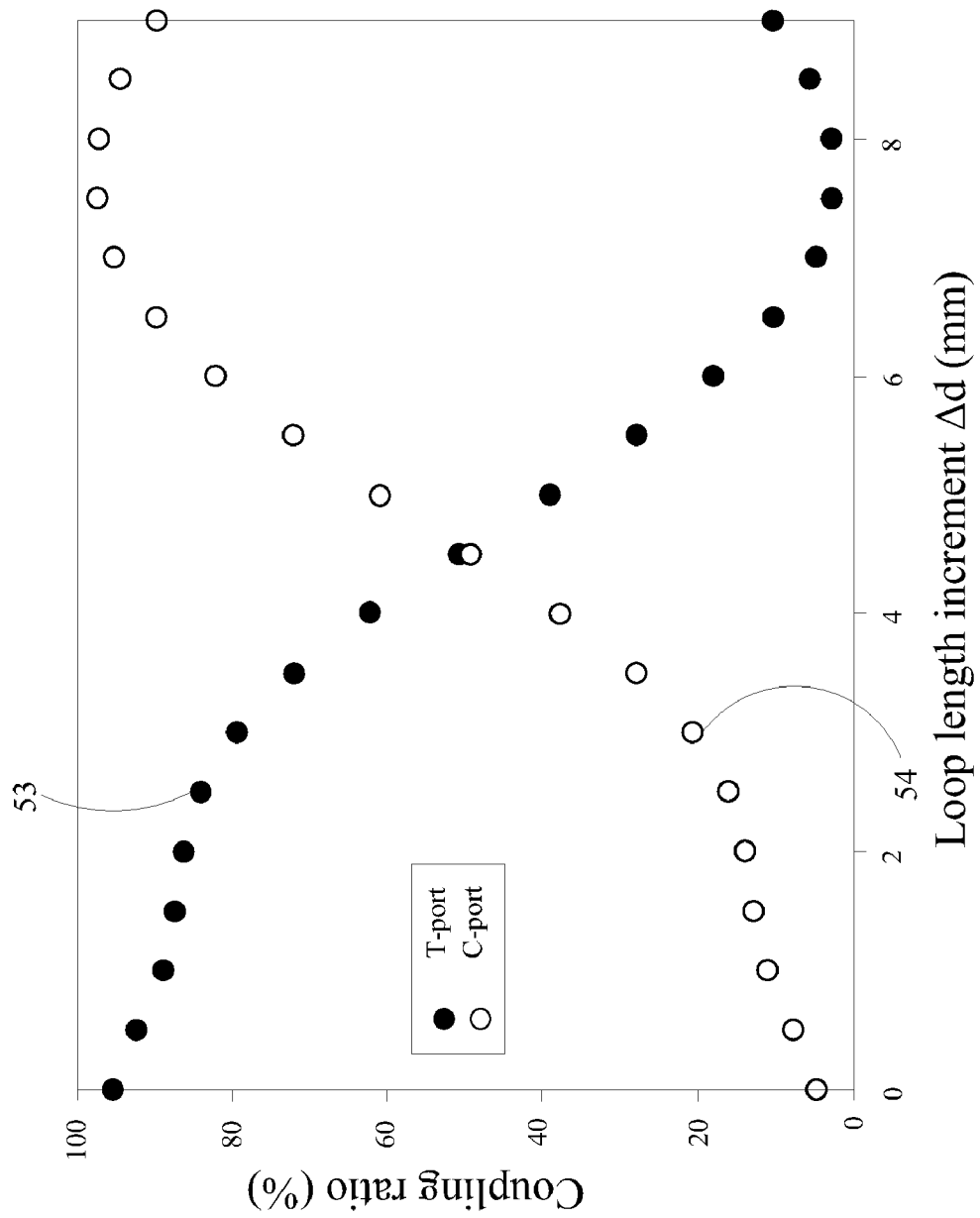
FIG. 6 shows effects of change of length of the fiber loop on measured values of the coupling ratio of the throughput output fiber as well as the coupled output fiber.

(3) step 63: assemble a coupling ratio modulation member; After bending and formation of the fiber loop 30, two ends of the fiber optic coupler with the fiber loop 30 are attached on the two loading parts 43, 44 in FIG. 3. Then remove the device and fix the coupler on a first base 41 (fixed base) and a second base 42 (removable base) of the modulation member 40 in FIG. 3. When the removable base is moving, the length and positions of intersection points of the fiber loop 30 also change. The curvature of the coupling region 33 and the propagation constant difference between the even mode and the odd mode are further changed. Thus the coupling ratio of the fiber optic coupler is tuned by the distance traveled of the removable base. As shown in FIG. 6, change of length of the fiber loop 30 has effects on measured values of the coupling ratio of the throughput output fiber and the coupled output fiber. In addition, the first base 41 and the second base 42 for mounting the fiber optic coupler with the fiber loop 30 are both removable bases.

Figure 7:
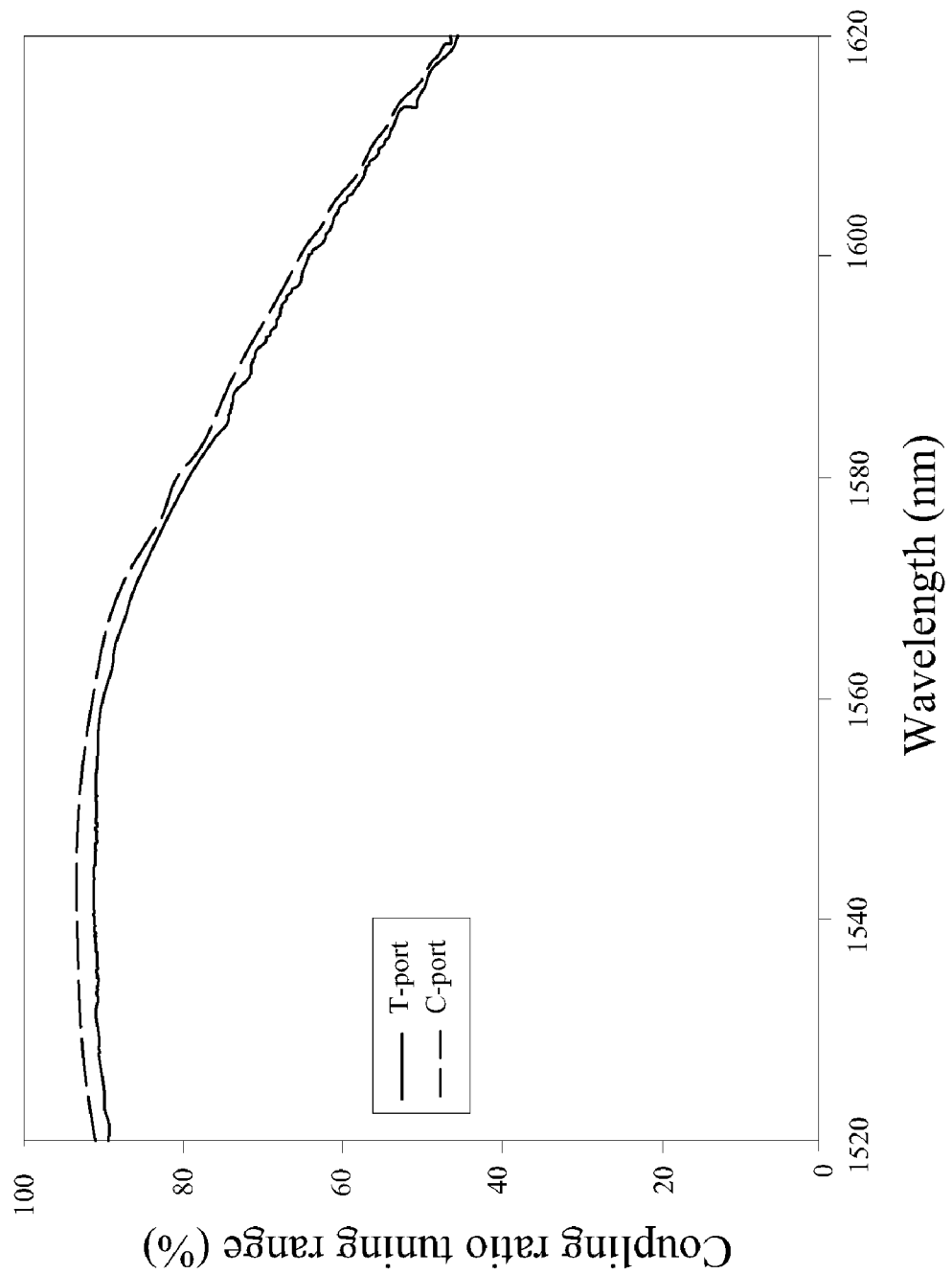
FIG. 7 is a schematic drawing showing change of the coupling ratio tuning range of the throughput output fiber as well as the coupled output fiber while input wavelength of the fiber optic coupler with variable coupling ratio changes.

Refer to FIG. 6, it shows relationship between the coupling ratio (vertical axis) and the change of the fiber loop length Δd (horizontal axis). The solid dot and hollow dot respectively represent coupling ratio of a throughput output end 53 (T-port) as well as a coupled output end 54 (C-port). The coupling ratio changes along with change of the loop length. The coupling ratio tuning range of the throughput output end is from 95% to 3% and that of the coupled output end is from 5% to 97%. The coupling ratio tuning range of the whole fiber optic coupler is 92%. FIG. 7 shows the wavelength within the coupling ratio tuning range is from 1524 nm to 1559 nm and the working wavelength range is over 30 nm.

In summary, by means of the method and the structure mentioned above, the present invention can produce fiber optic couplers with variable coupling ratio economically and rapidly and further reduces cost for reaching economic effects. Moreover, the present invention has features of stable splitting and modulation, and precise control. Thus the economic benefits of the device in manufacturing, operation quality and product competitiveness are all dramatically improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fiber optic coupler with variable coupling ratio comprising:
   an optical fiber set having at least one first optical fiber and at least one second optical fiber respectively with a connection portion;
   the first optical fiber as well as the second optical fiber is single-core single-mode fiber having a core on an inner layer and a cladding on an outer layer;
   a fiber loop formed by bending of the connection portion of the first optical fiber and the connection portion of the second optical fiber while the connection portion having a coupling region, an intersection point, an upper taper region and a down taper region on two sides of the coupling region; and
   a modulation member for positioning two ends of the first optical fiber and the second optical fiber toward the fiber loop, the modulation member comprises a first base and a second base respectively for mounting and positioning the two ends of the first optical fiber and the second optical fiber toward the fiber loop, two ends of the first optical fiber as well as the second optical fiber toward the fiber loop respectively are arranged with two loading parts, so that the two ends of the fiber loop are fixed on the first base and the second base by the loading parts, wherein the two ends of the first optical fiber as well as the second optical fiber toward the fiber loop are positioned on the loading parts by adhesive, which is a ultra-violet (UV) glue.

2. The device as claimed in claim 1, wherein the cladding of the first optical fiber as well as the second optical fiber is exposed by removing a protective layer thereover and the connection portion is formed by fusion and extension of the claddings.

3. The device as claimed in claim 1, wherein the first base is a fixed base while the second base is a removable base.

4. The device as claimed in claim 1, wherein the first base as well as the second base is a removable base.

5. A manufacturing method of fiber optic couplers with variable coupling ratio comprising the steps of:
   (1) producing a fiber optic coupler by fusion of claddings of at least two single-core single-mode fibers and then the fused claddings are extended from two ends under heated and fused state to form a fiber optic coupler with a linear coupling region and two taper regions on two sides of the coupling region;
   (2) bending a fiber loop, bending the coupling region and the taper regions to form a fiber loop; and
   (3) assembling a coupling ratio modulation member, fixing each end of two ends of the fiber optic coupler with the fiber loop on a base, wherein in the step (3), position of intersection point of the fiber loop and length of the fiber loop change along with movement of the base.

6. The method as claimed in claim 5, wherein in the step (1), a protective layer of the two single-core single-mode fibers is removed to expose the cladding for being fused weakly and extended.

7. The method as claimed in claim 5, wherein the step (1) further comprises
   (1-1) providing an incident light having X-polarized and Y-polarized components to one fiber of the fused fibers;
   (1-2) generating a coupling ratio change curve of a throughput output fiber while extending the fused fibers while the coupling ratio change curve of the throughput output fiber includes a polarization-modulated wave packet and modulation waist of the polarization-modulated wave packet appears only after a few periods of the coupling ratio change; and
   (1-3) breaking while at least one area point near the peak of the polarization-modulated wave packet is a break point of manufacturing of the fiber optic coupler.

8. The method as claimed in claim 5, wherein the step (3) further comprises: after bending and formation of the fiber loop, fix two ends of the fiber optic coupler with the fiber loop respectively on two loading parts by adhesive and then remove the loading parts with the fiber optic coupler and dispose the loading parts on the bases.

9. The method as claimed in claim 5, wherein at least one of the bases is a removable base.

10. A manufacturing method of fiber optic couplers with variable coupling ratio comprising the steps of:
    removing a protective layer with the same length of the same two single-core single-mode fibers and then crossing and attaching them with each other, and two ends of them are disposed on two extension bases respectively;
    heating middle part of the exposed, cross and attached fibers by a heat source so that claddings of the fibers are weakly fused;
    keeping heating the fused part of the claddings of the fibers;
    providing an incident light having X-polarized and Y-polarized components to one of the fibers;

stretching the fibers from the two ends and forming a curve of change of the coupling ratio by superposition of the coupling ratio curve of the X-polarized component and the Y-polarized component to form a fiber optic coupler with a coupling region and two taper regions while smaller change of effective refractive index difference and larger form birefringence between the even mode and the odd mode of the coupling region are generated during extension process, so that change period of the curve of the coupling ratio is larger and modulation waist of polarization-modulated wave packet appears only after a few periods of the change of the coupling ratio; and breaking while at least one area point near the peak of the polarization-modulated wave packet of the coupling ratio curve is defined as a break point of manufacturing of the fiber optic coupler.

11. The method as claimed in claim 10, wherein after finishing production of the fiber optic coupler, bend the coupling region and the two taper regions to form a fiber loop by movement and turning back of the two extension bases; then keep adjusting shape of the fiber loop until the upper and the down taper regions are on two sides of the bent coupling region and an intersection point is on area with larger diameter of the down taper region and the upper taper region.

12. The method as claimed in claim 10, wherein two ends of the fiber optic coupler with the fiber loop are fixed on two loading parts by adhesive while at least one of the two loading parts is fixed on a removable base; position of the intersection point of the fiber loop and length of the fiber loop change along with movement of the removable base while curvature of the coupling region and the propagation constant difference between the even mode and the odd mode of the coupling region are further changed so that the coupling ratio of the fiber optic coupler is tuned by distance traveled of the removable base and is with variable coupling ratio.

* * * * *